United States Patent
Young et al.

[19]

[11] Patent Number: 6,132,899
[45] Date of Patent: *Oct. 17, 2000

[54] BATTERY SEPARATOR HAVING DIFFERENT SIZE RIBS AND METHOD OF MAKING THE SAME

[75] Inventors: James Young, Sunriver; Francis E. Alexander, Corvallis; Daniel E. Weerts, Albany, all of Oreg.

[73] Assignee: Amtek Research International LLC, Lebanon, Oreg.

[*] Notice: This patent issued on a continued prosecution application filed under 37 CFR 1.53(d), and is subject to the twenty year patent term provisions of 35 U.S.C. 154(a)(2).

[21] Appl. No.: 08/954,411

[22] Filed: Oct. 20, 1997

[51] Int. Cl.[7] .................................................. H01M 2/18
[52] U.S. Cl. ................................. 429/147; 429/249
[58] Field of Search ................................ 429/249, 143, 429/146, 147, 247; 264/284, 286

[56] References Cited

U.S. PATENT DOCUMENTS

| | | | |
|---|---|---|---|
| 4,369,236 | 1/1983 | O'Rell et al. | 429/147 |
| 4,403,024 | 9/1983 | Gordon et al. | 429/146 |
| 4,927,722 | 5/1990 | Böhnstedt et al. | 429/147 |
| 5,679,479 | 10/1997 | Young et al. | 429/147 |
| 5,789,103 | 8/1998 | Young et al. | 429/147 |
| 5,894,055 | 4/1999 | Young et al. | 429/147 |

*Primary Examiner*—Maria Nuzzolillo
*Assistant Examiner*—Tracy Dove
*Attorney, Agent, or Firm*—Robert E. Howard

[57] ABSTRACT

A battery separator for use in flooded cell type lead acid batteries comprising a backweb of a porous, acid resistant, embossable material with a plurality of major ribs and submini-ribs extending from at least one planar surface of the backweb and a lesser plurality of stop-ribs extending from the other planar surface. Each major rib overlies at least one submini-rib and a number less than all of the major ribs overlies the stop-ribs. Each major rib is an embossed corrugated structure comprised of alternating ridges and furrows. The ridges and furrows are in non-parallel alignment to the longitudinal dimension of the separator, and preferably perpendicular thereto. The major ribs are formed on a battery separator backweb having a plurality of submini-ribs extending from one planar surface thereof and a lesser plurality of stop-ribs extending from the other planar surface thereof by passing the backweb through the nip formed by a pair of opposed embossing rollers and embossing the backweb in the area of at least one submini-rib and in the area of some of the stop-ribs.

35 Claims, 6 Drawing Sheets

BATTERY SEPARATOR HAVING DIFFERENT SIZE RIBS AND METHOD OF MAKING THE SAME

BACKGROUND OF THE INVENTION

This invention relates to a battery separator for use in flooded cell type lead acid batteries and to a method for making such separators.

In a flooded cell type lead acid battery the positive and negative electrodes or "plates" are separated by a battery separator. The battery separator typically has "ribs" or protrusions extending from at least one planar face of the separator. Such ribs are formed in one of several ways: the ribs can be formed integrally with the backweb of the separator; the ribs can be subsequently applied to the backweb as a bead of the same or different material as the backweb; or the ribs can be formed by embossing the backweb. The ribs function to provide proper spacing between the plates and to provide a space wherein free electrolyte resides.

The battery separator currently used by most flooded cell type lead acid battery manufacturers is of the microporous polyethylene type. This type of separator has a composition consisting essentially of an ultra high molecular weight polyethylene, a filler (typically amorphous silica), a plasticizer (typically a processing oil) and certain minor ingredients such as an antioxidant, lubricant and carbon black.

Microporous polyethylene separator material is commercially manufactured by passing the ingredients through a heated extruder, passing the extrudate generated by the extruder through a die and into the nip formed by two heated calender rolls to form a continuous web, extracting a substantial amount of the processing oil from the web by use of a solvent, drying the extracted web, slitting the web into lanes of predetermined width, and winding the lanes into rolls.

Such separators and a method of manufacturing them are described in U.S. Pat. No. 3,351,495.

Microporous polyethylene separators typically have a configuration comprising a backweb having a predetermined thickness, and a plurality of parallel ribs spaced apart a predetermined distance and extending outwardly from one planar surface of the backweb. The ribs extend continuously in a longitudinal direction parallel to the edges of the separator material. A partial perspective veiw of such a prior art seperator is illustrated in FIG. 8. The thickness of the backweb and height and spacing of the ribs is specified to the separator manufacturer by the battery manufacturer; the specifications are designed to maximize certain battery characteristics desired by the battery manufacturer.

It is also known to form "mini-ribs" between such "major" ribs to add stiffness to separator webs having thinner backwebs. Generally, such mini-ribs have a lower height than the major ribs and are spaced closer together. The height of such mini-ribs typically varies between about 0.006 inch and about 0.009 inch. The spacing of such mini-ribs varies between about 0.060 inch and about 0.250 inch.

Such ribs (both major and mini) are formed during manufacture of the microporous polyethylene separator by providing that one of the two heated calender rolls forming the nip through which the extrudate from the extruder is fed is engraved with grooves so that the ribs are formed as an integral part of the separator web.

There are many different specifications required by battery manufacturers relative to rib size and rib spacing. In manufacturing separator material to meet customer requirements, almost every change in rib size and spacing requires that the separator manufacturer shut down its manufacturing line in order to remove the engraved calender roll that had been in use to fill the prior order and to insert a differently configured engraved roll capable of producing the rib size and spacing required for the new order to be filled. Manufacturing time is lost during such shut-down and extra scrap material is generated during start-up of the line.

In addition, integrally formed ribs in the polyethylene type separator undergoes extraction along with the backweb and, because they have relatively more volume than a portion of the backweb occupying the same planar surface area, generally such ribs retain more processing oil than the backweb, thereby raising the overall electrical resistance of the separator.

In commonly owned copending U.S. patent application Ser. No. 08/646,764, filed May 8 1996 (now U.S. Pat. No. 5,679,479) there is disclosed a battery separator having a longitudinal dimension, a width dimension perpendicular to said longitudinal dimension, upper and lower planar faces, and a plurality of ribs (at least three) projecting from at least one planar face, said ribs extending in a direction substantially parallel to the longitudinal dimension of the separator, each of the ribs being formed of a plurality of individual projecting embossments forming a corrugated structure comprised of alternating ridges and furrows. The ribs may extend from one or both planar faces of the separator. Where the ribs extend from both planar faces, adjacent projecting embossments (ridges) on one planar face are separated by an indentation (furrow) which forms a projecting embossment (ridge) on the other planar face of the separator. Where ribs extend from both planar faces of the separator, the ribs projecting from one planar surface may have a height equal to or different from the height of the ribs extending from the other planar surface.

While the separator described in Ser. No. 08/646,764 performs very well where the rib height does not exceed about 0.030 inch, it has been found that with rib heights in excess of about 0.030 inch compression resistance of the ribs becomes less satisfactory. By "compression resistance" is meant resistance to a compressive force applied to the tops of the ribs. In commonly owned patent application Ser. No. 08/837,286, filed Apr. 11, 1997 (now U.S. Pat. No. 5,789,103) there is disclosed an improvement to the separator described in Ser. No. 08/646,764. The improved battery separator of the 08/837,286 patent application employs an embossable base web comprised of a backweb having a plurality of submini-ribs extending from at least one planar face thereof, the base web being embossed with a plurality of major ribs, each major rib extending into at least one, and preferably at least two, adjacent submini-ribs.

It has now been found that the compression resistance and stiffness of the battery separators described in Ser. No. 08/646,764 and Ser. No. 08/837,286 can be improved by providing a plurality of "stop-ribs" across the width of the separator. Such stop-ribs are formed integral with the backweb of the separator during formation of the separator sheet by means of an engraved calender roll.

It is an object of this invention to provide a separator having ribs formed of a plurality of individual projecting embossments forming a corrugated structure comprised of alternating ridges and furrows which has improved compression resistance and stiffness.

SUMMARY OF THE INVENTION

This invention relates to a battery separator having a longitudinal dimension, a width dimension perpendicular to said longitudinal dimension, upper and lower planar faces, a plurality of submini-ribs extending from at least one of said planar faces, a lesser plurality of stop-ribs extending from the other planar face, and a plurality of individual projecting embossments forming plurality of major ribs, each of said major ribs being a corrugated structure comprised of alternating ridges and furrows, each of which major ribs extending into at least one of the submini-ribs and some, but not all, of the major ribs extending into some of the stop-ribs.

DESCRIPTION OF PREFERRED EMBODIMENTS

Figure 1:
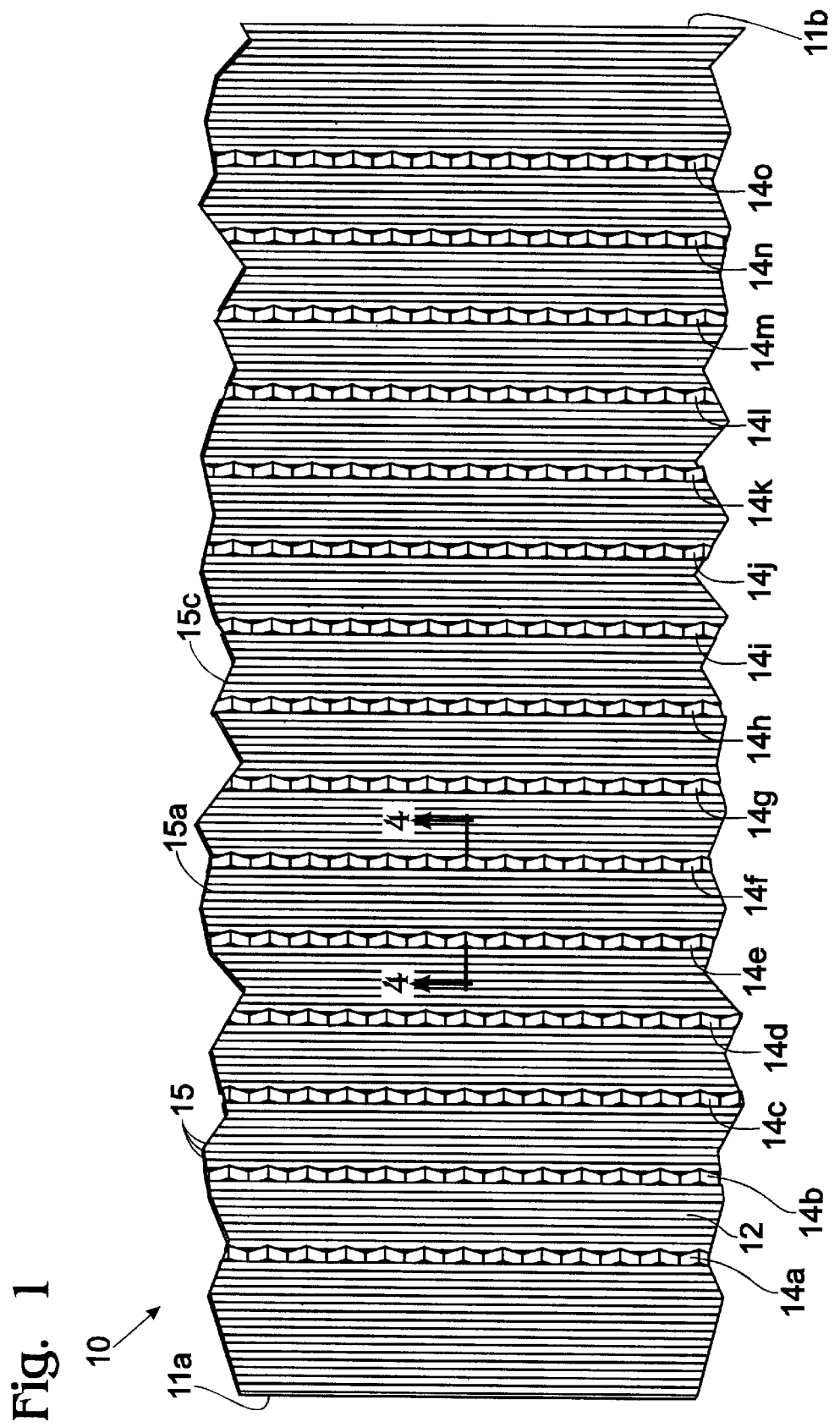
FIG. 1 is a partial perspective view of the upper planar surface of the separator material of this invention.

FIG. 1 is a partial perspective top view of the separator 10 of this invention. Separator 10 has parallel, longitudinal edges 11a and 11b, and upper and lower planar surfaces 12 and 13, respectively.

Projecting from the upper planar surface 12 of separator 10 are a plurality of major ribs 14a through 14o. The major ribs 14 are disposed in the longitudinal direction of the separator 10, substantially parallel to longitudinal edges 11a and 11b thereof.

Also projecting from the upper planar surface 12 of separator 10 are a larger plurality of substantially evenly spaced "submini-ribs" 15. These ribs are called "sub-mini ribs" because they are generally shorter and spaced closer together than prior art mini-ribs. Submini-ribs 15 are also disposed in the longitudinal direction of the separator 10, substantially parallel to longitudinal edges 11a and 11b thereof. In the preferred embodiment, submini-ribs 15 are formed integral with backweb 20.

Figure 4:
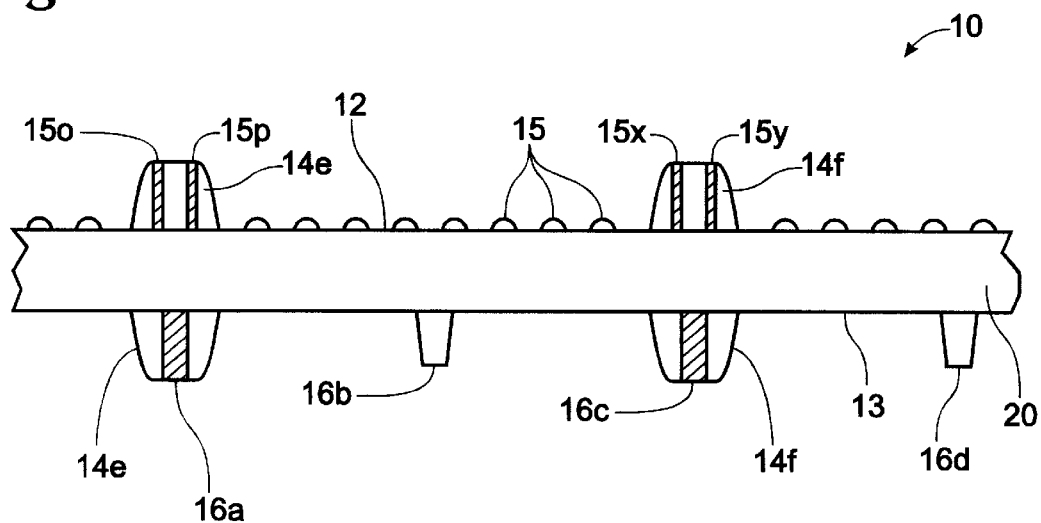
FIG. 4 is an enlarged partial edge view in cross-section of a portion of the separator of this invention taken along line 4—4 of FIGS. 1 and 2.

Major ribs 14 are formed by embossing separator 10 in the 16 area of one or more submini-ribs 15. The major ribs 14 illustrated in FIG. 1 do not show the presence of submini ribs 15 therein for the sake of clarifying the drawing. The relationship of the submini-ribs 15 and major ribs 14 is best shown in FIGS. 4.

FIG. 1B illustrates the lower planar surface 13 of separator 10. A plurality of stop-ribs 16 extend from lower planar surface 13 and, in the preferred embodiment, are formed integral with backweb 20. Stop-ribs 16 are disposed in the longitudinal direction of separator 10, substantially parallel to longitudinal edges 11a and 11b thereof. The spacing between adjacent stop-ribs 16 is greater than the spacing between adjacent major ribs 14. Preferably, the spacing is such that only fifty percent of the major ribs 14 overlays a stop-rib 16. The spacing may, however, be such that between about thirty percent and about seventy percent of the major ribs 14 overlays a stop-rib 16.

Although major ribs 14 may extend only from one of the planar surfaces of separator 10, it is preferred that they extend from both planar faces, as will be further described.

Figure 3:
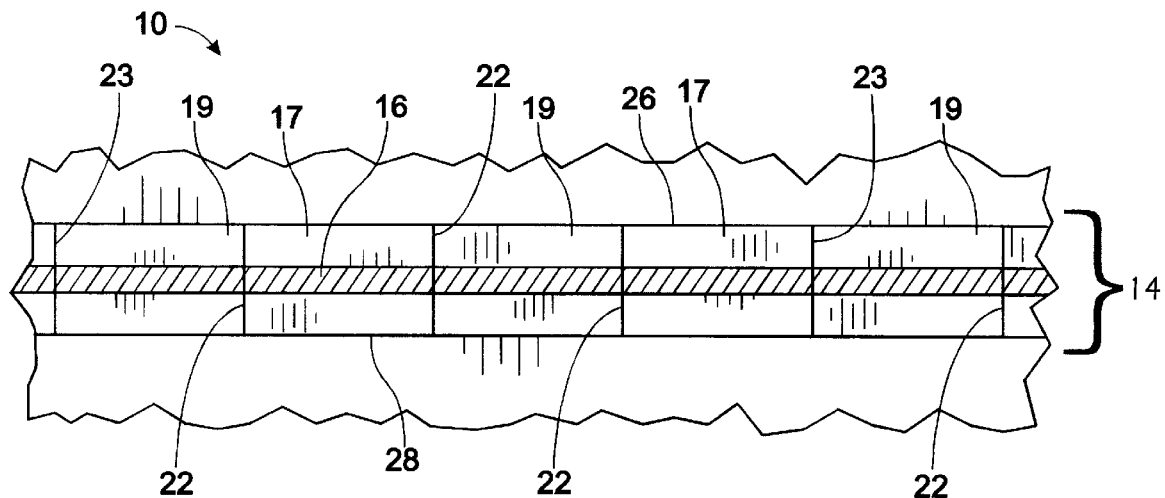
FIG. 3 is an enlarged partial bottom plan view of a single rib of this invention.

FIG. 3 is an enlarged, partial bottom view of a major rib 14. Major rib 14 is shown as having been embossed in an area encompassing a single stop-rib 16. The spacing of the stop-ribs 16 may be selected so that between about 30% and about 70% of the major ribs 14 overlay and are embossed into a stop-rib 16.

FIG. 4 is a cross-sectional view through separator 10. As can be seen, a plurality of submini-ribs 15 extend from upper planar surface 12 of backweb 20 and a plurality of stop-ribs 16a, 16b, and 16c extend from the lower planar surface 13 of backweb 20. Major ribs 14e and 14f are embossed into the backweb 20. Major rib 14e is embossed into two submini-ribs 15o and 15p and into a single stop-rib 16a. Major rib 14f is embossed into two submini-ribs 15x and 15y but not into any stop-rib 16.

The length dimension of the ridges 22 and 23 i.e., the length of the ridges 22 and 23 from one side wall 26 to the other side wall 28 of major rib 14, is selected in accordance with the desired width of the rib. This dimension will generally be between about 0.020 and about 0.100 inch.

The frequency of the ridges, i.e., the number of ridges per unit of rib length, will preferably be between about 5 and about 25 ridges per inch.

The height of the ridges 22 and 23 above the respective planar surfaces 12 and 13 of the backweb 20 is selected in accordance with the desired height of the major ribs 14. This dimension will generally be between about 0.01 to about 0.10 inch. The submini-ribs 15 are particularly useful in providing improved compression resistance when the desired height of major ribs 14 is greater than about 0.030 inch.

The distance between adjacent major ribs 14 will generally be between about 0.25 to about 1.0 inch.

The height of the submini-ribs 15 above the upper planar surface of the separator will Generally be between about 0.003 inch and about 0.009 inch. Selection of an appropriate height for the submini-ribs 15 will depend upon the height of the major ribs 14 and the desired compression resistance.

The width of the submini-ribs 15 may vary between about 0.010 inch and about 0.020 inch.

The submini-ribs 15 will generally be evenly spaced, between about 0.025 inch and about 0.050 inch, across the width of the separator.

The height of the stop-ribs above the backweb can be between about 0.005 inch and 0.015 inch, preferably about 0.010 inch.

The top width of the stop-ribs can be between about 0.010 inch and about 0.020 inch, preferably between about 0.015 inch and about 0.017 inch. The stop-rib has a cross section in the shape of a trapezoid with the widest part located at its intersection with the backweb. The angle of the sides is about 7 degrees from the vertical.

The stop-ribs are spaced apart a distance of between about 0.100 inch and about 0.200 inch, preferably about 0.150 inch. The spacing distance is selected to provide that between about 30% and about 70% of the major ribs overlies and is embossed into a stop-rib.

The width of the separator of this invention can be any width used by battery manufacturers; generally this width will range between about 2 to about 12 inches with side edges 16 and 18 being parallel to each other.

The thickness of backweb 20 of the separator 10 will typically range between about 0.002 to about 0.025 inch.

Figure 2:
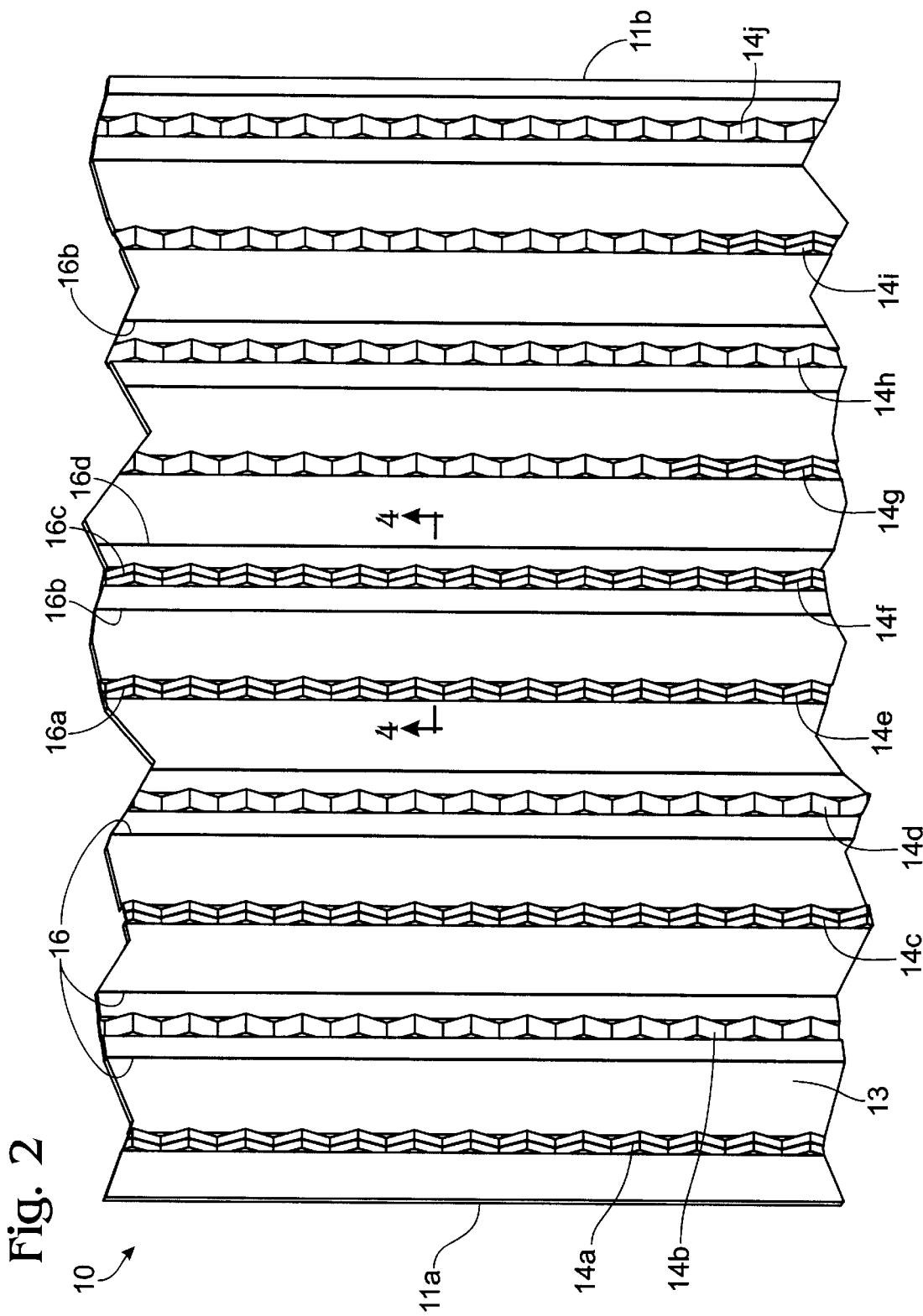
FIG. 2 is a partial perspective view of the lower planar surface of the separator material of this invention.

The cross-section of the corrugated structure forming the rib of this invention is illustrated in FIGS. 1–3 as being triangular, with each individual embossed projection thus being wedge shaped. Each wedge shaped embossment is comprised of a sloping leading wall 17, a sloping trailing wall 19 and vertical side walls 26 and 28, as best seen in FIG. 3. However, other similar wedge shapes may be used, including but not limited to a rounded wedge shape where the ridge is slightly rounded instead of angular, or a flattened wedge shape where the ridge is either formed flat during embossing or the ridge flattened by subsequent pressing.

One of the advantages obtained in using the separator of the present invention is that, since the ribs are a corrugated structure formed of adjacent ridges and furrows, the separator provides a substantially barrier free environment for flow of electrolyte and any gases released during charging and discharging since the ribs contact the plates only in the ridge area. Prior art ribs being solid, are in contact with the positive plate in the entire upper surface area of the rib which imposes a barrier to electrolyte and/or gas flow.

A further advantage obtained in using the separator of the present invention is in reducing or eliminating rib bending and/or flattening. In assembling a battery the number of alternating enveloped (with separator material) and unenveloped plates required to form a cell are stacked together, compressed and inserted into a cell compartment of a battery case. The compressive forces to which the separators are subjected can cause undesirable rib bending and/or flattening with conventional rib construction, especially at higher "overall" dimensions, i.e., rib heights. The rib configuration of the present invention reduces or eliminates such rib bending and/or flattening.

The use of submini-ribs 15 to provide higher major rib height without loss of compression resistance also allows separators to be made with thinner backwebs which means a savings in the amount of material required to make a specified square footage of separator product.

Another advantage to the submini-ribbed separator product is that longer production runs between tooling changes can be made compared to manufacturing separator product with major ribs being formed on the production line. Also, solvent extraction and drying of submini-ribbed product is easier and faster than product having major ribs formed thereon during manufacture.

Although the separator of the invention is illustrated as having major ribs 14 extending from both planar surfaces 12 and 13 of the backweb 20, the invention is intended to include a separator where the major ribs are formed on only one side.

Where the major ribs 14 extend from both planar surfaces of the backweb 20 of separator 10, the height above of the ribs 14 above planar surfaces 12 and 13, respectively, of backweb 20, may be the same or the height of the ribs on one side may be greater or lesser than the height of the ribs on the other side.

It is preferred that the submini-ribs 15 extend from only one planar surfaces of the backweb 20 with the stop-ribs 16 extending from the opposite planar surface. However, either or both of the submini-ribs and the stop -ribs may extend from both planar faces of the backweb.

Figure 5:
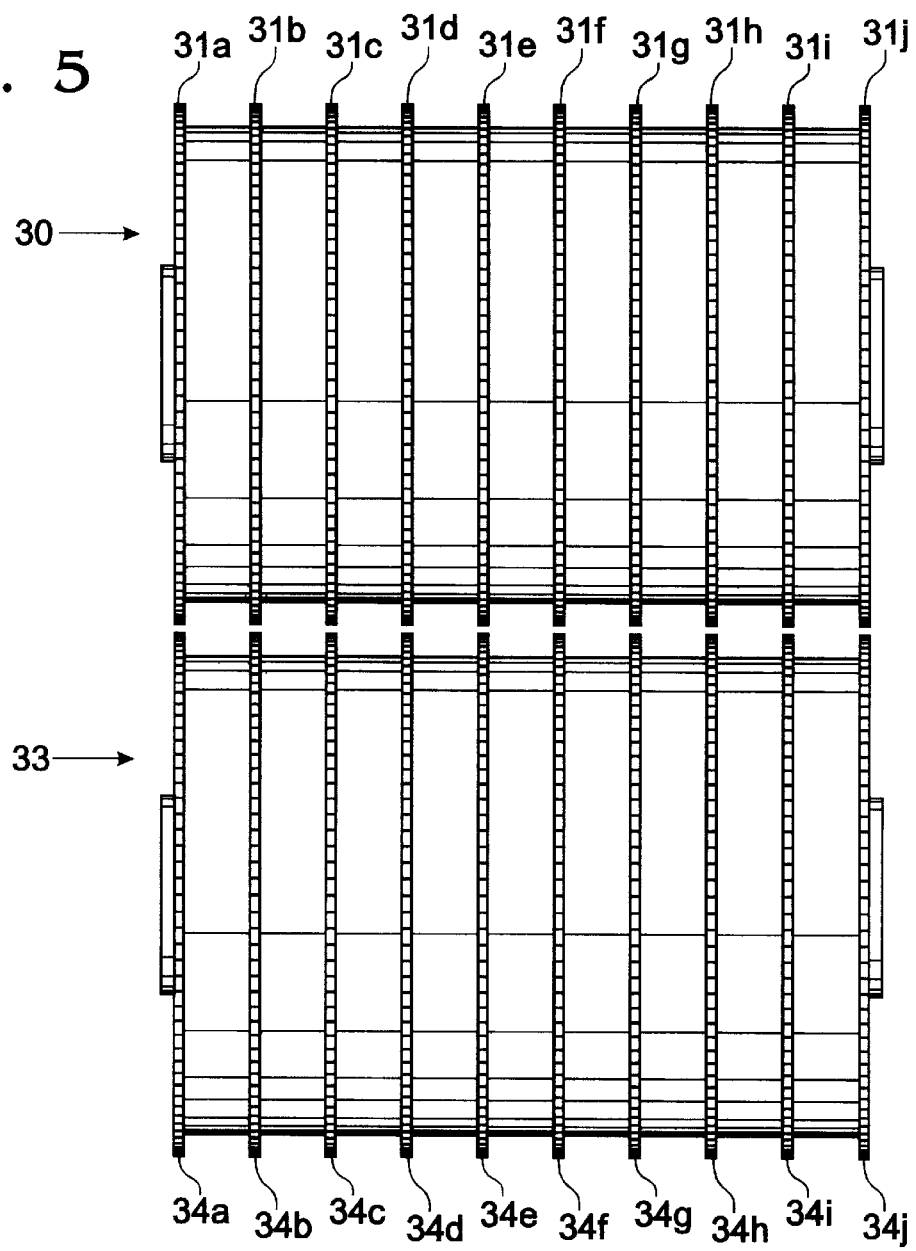
FIG. 5 is a frontal view of two embossing rolls employing a plurality of embossing wheels.
Figure 7:
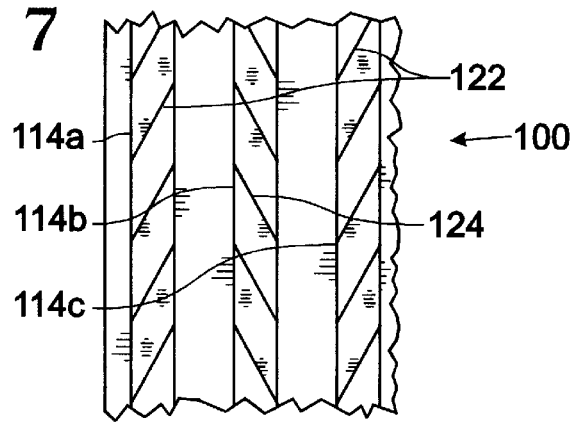
FIGS. 7 through 10 are partial top plan views of the upper planar surface of the separator illustrating several alternative configurations for the rib configuration.
Figure 6:
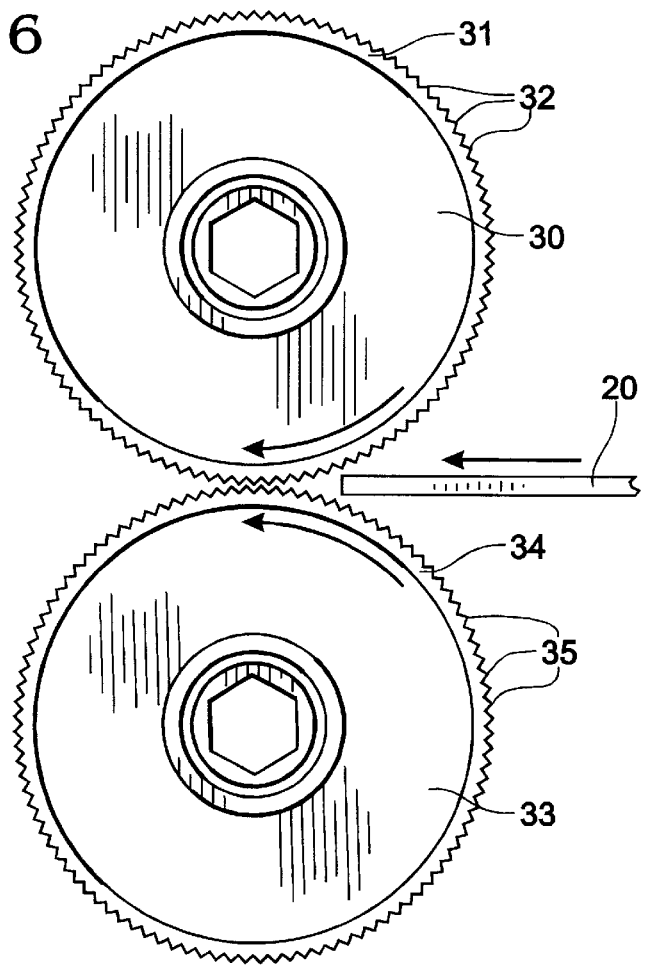
FIG. 6 is a side view of two adjacent embossing wheels.

FIGS. 5 and 6 illustrate an apparatus suitable for making the separators of this invention. FIG. 7 is a front view of two embossing rolls 30 and 33 having a plurality of embossing wheels 31a–31j and 34a–33j, respectively, located there on. Each of embossing wheels 31a–31g on embossing roll 30 are aligned with embossing wheels 31a–33j, respectively, on embossing roll 33. Each of the embossing wheels 31 and 34 are, essentially, specially shaped gear wheels with a plurality of gear teeth 32 and 35, respectively, projecting therefrom, as best seen in FIG. 6. The phrase "embossing wheels" is intended to include both separate gear wheels located on an embossing roll or axle (such as by press fitting) or an embossing roll having multiple rows of teeth machined therein.

Embossing rolls 30 and/or 33 are rotated by suitable drive means, not shown. It is preferred to have only one of embossing rolls 30 or 33 driven by external drive means with the other roll being rotated by the driven embossing roll.

The gear teeth 32 and 35 of aligned embossing wheels 31 and 34 intermesh and emboss major ribs 14 into flat separator material 20 when it is passed through the nip between rotating embossing rolls 30 and 33 in the direction indicated by the arrow in FIG. 6.

Where the height of the ribs extending from both planar faces are the same, the teeth 32 and 35 are equal in height.

Where the height of the ribs one side is different than the height of the ribs on the other side, the height of gear teeth 32 and 35 are, correspondingly, different in height.

Where it is desired to have ribs extending from only one surface of the separator, one of embossing wheels 31 or 34 may be a "male" roll having gear teeth as illustrated with the other embossing wheel being a "female" roll having grooves therein with dimensions corresponding to the dimensions of the gear teeth extending from the male roll.

Where it is desired to have a rib where adjacent ridges have different heights above the adjacent planar surface of the separator backweb this may be achieved by using as the first embossing roll a male with gear teeth of varying height and as the second embossing roll a smooth roll formed of rubber or other deformable material.

Figure 11:
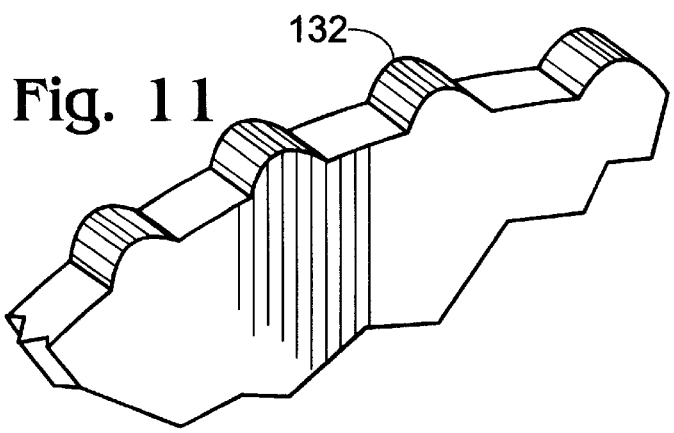
FIG. 11 is a perspective view of an embossing tooth having a rounded wedge shape.

For ease of illustration gear teeth 32 and 35 are shown as having sharp apexes to form sharp ridges in the product illustrated in FIGS. 1–3. However, it is preferred to round the apexes of teeth 32 and 35 and other sharp edges of the teeth in order to minimize stress cracking of the separator substrate. Such a rounded tooth 132 is shown in FIG. 11.

Figure 12:
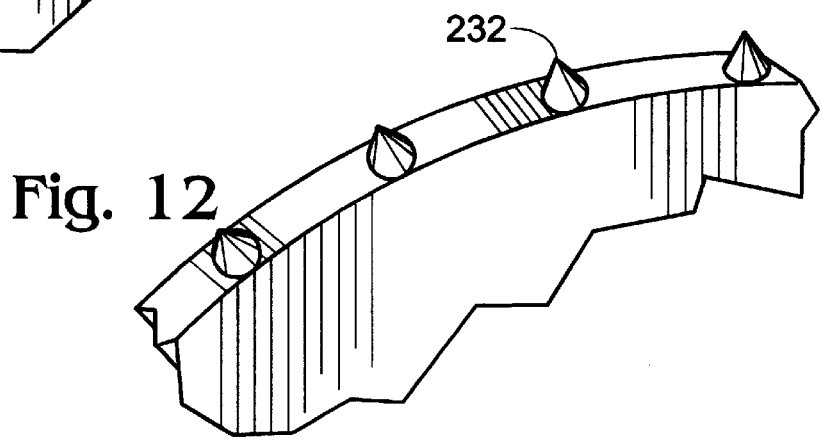
FIG. 12 is a perspective view of an embossing tooth having a conical shape.
Figure 13:
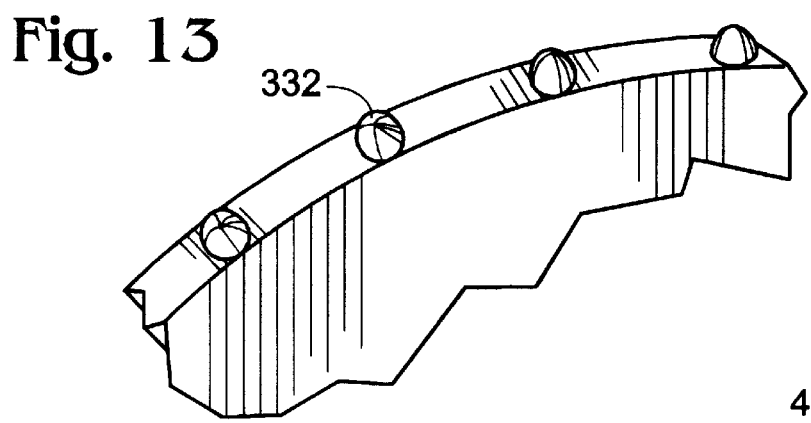
FIG. 13 is a perspective view of an embossing tooth having a hemispherical shape.
Figure 14:
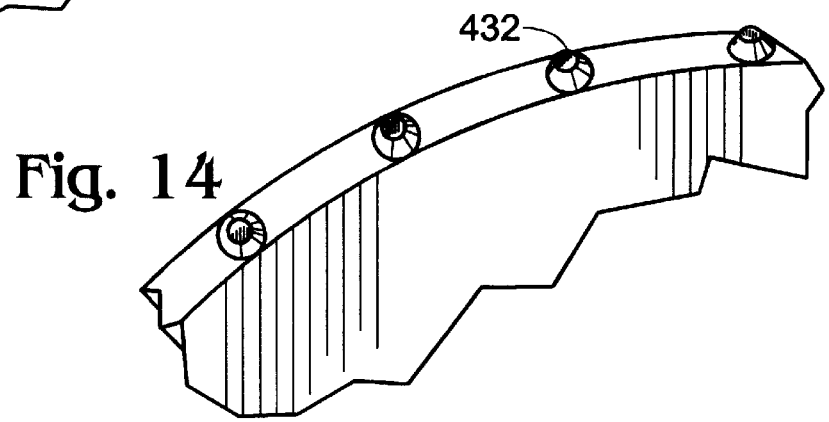
FIG. 14 is a perspective view of an embossing tooth having the shape of a truncated cone.

In addition, instead of having essentially wedge-shaped teeth, teeth of other configurations may be used to form the major rib embossments. For example, FIG. 12 shows a gear tooth 232 having a conical shape. FIG. 13 shows a gear tooth 332 having a hemispherical shape. FIG. 14 shows a gear tooth 432 having the shape of a truncated cone.

The formation of the ribs of the present invention involves plastic deformation of the backweb material at the location where the embossing takes place. Plastic deformation indicates that the material was loaded beyond its yield point which, by definition, means that it has experienced plastic flow. It has been shown that oxidation resistance is improved in the area of plastic deformation due to oil being driven to the surface upon collapse of micropores.

Although the invention has been described relative to forming ribs in a microporous polyethylene separator, as this is the principal type of separator material currently used by flooded cell type lead acid battery manufacturers, any separator material which is porous, acid resistant and capable of being permanently embossed may be used. These materials may be generally characterized as filled or unfilled films and nonwoven webs of thermoplastic or thermoset polymers. Suitable thermoplastic polymers include polymers and copolymers of ethylene, propylene, butylene, vinyl chloride and styrene. Suitable thermoset compositions include phenolics, ethylene/propylene/diene, isoprene, butadiene, styrene and similar thermosetting polymers.

The ribs have been illustrated in the preferred embodiment disclosed herein as having ridges and furrows that are perpendicularly aligned with the longitudinal dimension of the separator. However, the alignment of the ridges and furrows may be such as to form an angle to the longitudinal dimension of the separator, such angle being less than 180 degrees, and preferably less than about 160 degrees, to the longitudinal dimension, but greater than 0 degrees and preferably greater than about 20 degrees. In addition, the alignment of the ridges and furrows of some ribs to the longitudinal dimension of the separator may vary from the alignment of the ridges and furrows of other ribs.

Examples of such alternative configurations are illustrated in FIGS. 7–10.

FIG. 7 illustrates a separator 100 in which the major ribs 114 have embossments in adjacent major ribs 114a, 114b and 114c whose ridges 122 and 124, and corresponding furrows, are alternatingly angled with respect to each other.

Figure 8:
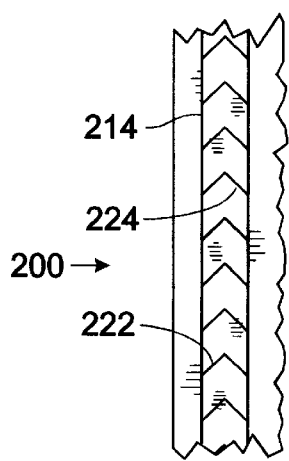

FIG. 8 illustrates a separator 200 in which the ridges of major rib 214 form a chevron pattern made up of ridge elements 222 and 224.

Figure 9:
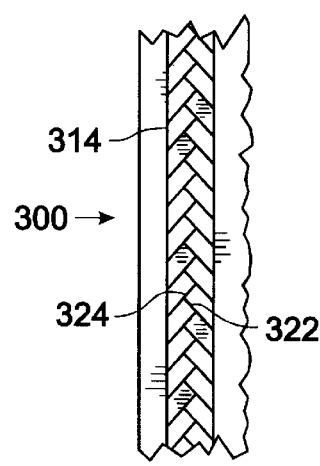

FIG. 9 illustrates a separator 300 in which the ridges of major rib 314 form a tractor tread pattern made up of ridge elements 322 and 324.

Figure 10:
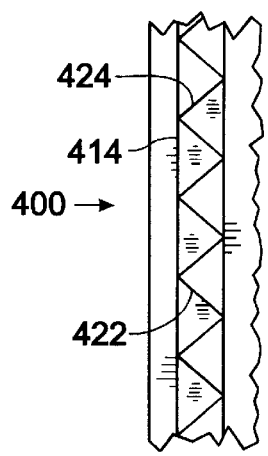

FIG. 10 illustrates a separator 400 in which the ridges of major rib 414 form a continuous sinusoidal (zig-zag) pattern made up of ridge elements 422 and 424. The continuous sinusoidal pattern of the ridges could be rounded ("S" shaped) instead of sharp as illustrated in FIG. 10.

A primary advantage of the present invention is that it allows battery separator manufacturers to continuously produce a uniform sheet of microporous material without interrupting the manufacturing process to change engraved calender rolls. Such sheet material would then be supplied to the battery manufacturer in rolls of appropriate width and the battery manufacturer would apply the major ribs in accordance with this invention. It is contemplated that such ribs would be applied just prior to the plate enveloping operation.

The invention claimed is:

1. A battery separator comprising: a backweb of porous, acid resistant, embossable material, said backweb having longitudinal side edges, a width dimension perpendicular to said longitudinal side edges, and upper and lower planar surfaces; said separator having a plurality of stop-ribs projecting from at least one planar surface of said backweb; said separator having a plurality of major ribs, less than all of said major ribs being embossed into at least one stop-rib, each of said major ribs being a corrugated structure comprised of alternating ridges and furrows, said ridges and furrows being in non-parallel alignment with said longitudinal side edges of said backweb.

2. The battery separator of claim 1 wherein said backweb is microporous polyethylene.

3. The battery separator of claim 1 wherein said ridges and furrows are substantially perpendicular to the longitudinal edges of said backweb.

4. The battery separator of claim 3 wherein the frequency of said ridges is between about 5 and about 25 per inch.

5. The battery separator of claim 1 wherein said ridges and furrows are at an angle to the longitudinal dimension of said backweb of between about 20 degrees and about 160 degrees.

6. The battery separator of claim 5 wherein the ridges and furrows of at least some of the ribs are at a different angle to the longitudinal dimension of said backweb than that of the ridges and furrows of immediately adjacent ribs.

7. The battery separator of claim 6 wherein the ridges and furrows of a first set of ribs consisting of every other rib is at an angle to the longitudinal dimension of said backweb of between about 20 degrees and less than about 90 degrees and the angle of the ridges and furrows of a second set of ribs consisting of ribs immediately adjacent said first set of ribs is at an angle to the longitudinal dimension of said backweb of between about 160 degrees and greater than about 90 degrees.

8. The battery separator of claim 1 wherein said ridges and furrows of at least some of the ribs are in a chevron pattern.

9. The battery separator of claim 1 wherein said ridges and furrows of at least some of the ribs are in a tractor tread pattern.

10. The battery separator of claim 1 wherein said ridges and furrows of at least some of the ribs are in a continuous sinusoidal pattern.

11. The battery separator of claim 1 wherein said submini-ribs are substantially evenly spaced across the width of said separator.

12. The battery separator of claim 1 wherein the width of the major ribs and the spacing of the submini-ribs are such as to cause each of said major rib to be embossed into at least two adjacent submini-ribs.

13. The battery separator of claim 12 wherein each said major rib is embossed into three adjacent submini-ribs.

14. The battery separator of claim 1 wherein said submini-ribs have a height above the backweb of between about 0.003 inch and about 0.009 inch.

15. The battery separator of claim 1 wherein said submini-ribs are substantially evenly spaced across the width of said backweb.

16. The battery separator of claim 1 wherein said submini-ribs are spaced apart by a distance of between about 0.025 inch and about 0.050 inch.

17. The battery separator of claim 1 wherein the stop-ribs are spaced such that between about 30% and about 70% are embossed into said major ribs.

18. The battery separator of claim 17 wherein the stop-ribs are spaced such that about 50% are embossed into said major ribs.

19. The battery separator of claim 1 wherein said backweb has a thickness of between about 0.002 inch and about 0.008 inch.

20. A method of making a battery separator comprising:
forming a plurality of submini-ribs on one planar surface of a web of a porous, acid resistant, embossable separator material, said submini-ribs being substantially parallel to the longitudinal edges of said web; forming a lesser plurality of stop-ribs on the other planar surface of said web; embossing said web in a plurality of narrow lanes, each of said lanes overlying at least one submini-rib with less than all of said lanes overlying a stop-rib, by subjecting said web to plastic deformation at a plurality of embossment sites within said lanes to form in each of said lanes a corrugated structure extending from at least one planar face of said web, said corrugated structure having alternating ridges and furrows that are non-parallel to said longitudinal edges of said web.

21. The method of claim 20 wherein said embossing is effected by passing the web into the nip formed by pairs of opposed embossing wheels positioned in the locations of said narrow lanes.

22. The method of claim 20 wherein said separator material is microporous polyethylene.

23. The method of claim 20 wherein each of said lanes overlies at least two submini-ribs.

24. The method of claim 23 wherein each of said lanes overlies three submini-ribs.

25. The method of claim 20 wherein said lanes overlay between about 30% and about 70% of said stop-ribs.

26. The method of claim 25 wherein said lanes overlay about 50% of said stop-ribs.

27. The battery separator of claim 1 wherein said stop-ribs have a height above the backweb of between about 0.005 and about 0.015 inch.

28. The battery separator of claim 1 wherein said stop-ribs are spaced apart a distance of between about 0.100 and about 0.200 inch.

29. The battery separator of claim 1 wherein said stop-ribs have a substantially trapezoidal cross-section.

30. A web useful in making a battery separator comprising a backweb of porous, acid resistant, embossable material, said backweb having longitudinal side edges, a width dimension perpendicular to said longitudinal side edges, and upper and lower planar surfaces; said backweb having a plurality of submini-ribs projecting from at least one planar surface of said backweb across substantially the entire width of said separator, the longitudinal dimension of said submini-ribs extending substantially parallel to the longitudinal side edges of said backweb, each of said submini-ribs being substantially evenly spaced apart by a distance of less than about 0.050 inch, said submini-ribs having a height above the backweb of between about 0.003 and about 0.009 inch; said backweb having a lesser plurality of stop-ribs projecting from at least the other planar surface of said backweb.

31. The web of claim 30 wherein said stop-ribs have a height above the backweb of between about 0.005 and about 0.015 inch.

32. The web of claim 30 wherein said stop-ribs are spaced apart a distance of between about 0.100 and about 0.200 inch.

33. The web of claim 30 wherein said stop-ribs have a substantially trapezoidal cross-section.

34. A battery separator of claim 1 further comprising a plurality of submini-ribs projecting from at least one planar surface of said backweb, said submini-ribs extending substantially parallel to the longitudinal side edges of said backweb.

35. A battery separator of claim 34 wherein each said major rib is embossed into at least one of said submini-ribs.

* * * * *

UNITED STATES PATENT AND TRADEMARK OFFICE
CERTIFICATE OF CORRECTION

PATENT NO : 6,132,899
DATED : Oct. 17, 2000
INVENTOR(S): James Young, et al.

It is certified that error appears in the above-identified patent and that said Letters Patent is hereby corrected as shown below:

Column 1, lines 45 and 46, cancel "A partial perspective view of such a prior art separator is illustrated in FIG. 8." Column 3, line 60, cancel "16". Column 3, line 65, change "1B" to --2--. Column 5, line 11, change "3" to --4--. Column 6, line 5, change "7" to --5--. Column 6, line 8, change "31g" to --31j--. Column 6, line 9, change "31a-33j" to --34a-34j--.

Signed and Sealed this

Eighth Day of May, 2001

Attest:

NICHOLAS P. GODICI

Attesting Officer

Acting Director of the United States Patent and Trademark Office